United States Patent [19]
Hefner, Jr. et al.

[11] Patent Number: 4,618,658
[45] Date of Patent: Oct. 21, 1986

[54] POLYMER MODIFIED EPOXY RESIN COMPOSITIONS

[75] Inventors: Robert E. Hefner, Jr.; Virginia B. Messick, both of Lake Jackson, Tex.

[73] Assignee: The Dow Chemical Company, Midland, Mich.

[21] Appl. No.: 734,516

[22] Filed: May 16, 1985

[51] Int. Cl.[4] .............................................. C08L 63/10
[52] U.S. Cl. ................................. 525/454; 525/455; 525/502; 525/528; 525/531; 525/920; 525/922; 526/273
[58] Field of Search ............... 525/528, 531, 922, 454, 525/455, 920, 502; 526/273

[56] References Cited

U.S. PATENT DOCUMENTS

| 3,297,745 | 1/1967 | Fekete et al. | 260/471 |
| 3,598,866 | 8/1971 | Nowak et al. | 260/479 |
| 4,360,653 | 11/1982 | Stevens et al. | 526/301 |
| 4,374,963 | 2/1983 | Morgan | 525/486 |
| 4,390,662 | 6/1983 | Ando et al. | 525/28 |
| 4,486,582 | 12/1984 | Hefner, Jr. | 526/301 |

FOREIGN PATENT DOCUMENTS 57745 4/1982 Japan .

Primary Examiner—John C. Bleutge
Assistant Examiner—Patricia A. Short
Attorney, Agent, or Firm—J. G. Carter

[57] ABSTRACT

Polymer modified epoxy resin compositions are disclosed which comprise (A) an epoxy resin wherein a portion of the epoxide groups have been reacted to provide groups containing polymerizable ethylenic unsaturation; (B) at least one vinyl terminated urethane oligomer and optionally (C) at least one polymerizable ethylenically unsaturated compound. These compositions are useful as intermediates to novel polymer modified vinyl esters and thermoset (cured) products.

13 Claims, No Drawings

POLYMER MODIFIED EPOXY RESIN COMPOSITIONS

BACKGROUND OF THE INVENTION

Japanese Pat. No. 57,745 (1982) discloses epoxy resins containing dispersed polymer produced by copolymerization of isocyanate-polyol prepolymer addition products of hydroxyacrylates and other ethylenically unsaturated monomers as well as cured compositions thereof. Said modified epoxy resins are produced by adding isocyanate-polyol prepolymer addition products of hydroxyacrylates and other ethylenically unsaturated monomers to epoxy resin and then copolymerizing therein. Although said compositions containing a polymer dispersed in the epoxy resin provide improved adhesion, the dispersed polymer is not chemically bonded to the epoxy resin backbone and is thus susceptible to migration or extraction from the cured resin.

U.S. Pat. Nos. 3,297,745 and 4,390,662 disclose the copolymerization of mixtures of vinyl ester resins (vinyl ester plus ethylenically unsaturated monomer such as styrene) and vinyl terminated urethane oligomers. The vinyl ester compositions of the aforesaid inventions do not possess polymer modification, that is, the vinyl terminated urethane oligomer and optional polymerizable ethylenically unsaturated compound are not chemically bonded to the precursor epoxy resin backbone.

The present invention provides novel polymer modified epoxy resin compositions produced by copolymerization of an epoxy resin containing polymerizable ethylenic unsaturation and a vinyl terminated urethane oligomer and, optionally, a polymerizable ethylenically unsaturated compound.

An additional embodiment of the present invention pertains to cured polymer modified epoxy resin compositions.

A further embodiment of the present invention pertains to polymer modified vinyl esters produced by reaction of the aforesaid polymer modified epoxy resin and a monounsaturated monocarboxylic acid.

An additional embodiment of the present invention pertains to cured polymer modified vinyl esters and vinyl ester resin (vinyl ester plus polymerizable ethylenically unsaturated monomer such as styrene) compositions.

Both the polymer modified epoxy resins and vinyl ester resins of the present invention provide cured compositions with enhanced properties such as tensile strength, elongation, ductility or the like while largely retaining the other mechanical properties. Furthermore, said compositions are not susceptible to mechanical property losses due to extraction or migration of the polymerized vinyl terminated urethane oligomer component, since it is at least partially chemically bonded to the epoxy resin backbone. Furthermore, the total or partial chemical bonding (grafting) of the vinyl terminated urethane oligomer and polymerizable ethylenically unsaturated compound, if any, provides epoxy resin compositions with generally enhanced mechanical properties relative to the prior art epoxy resins containing only a dispersed polymer phase. This is due to compatibilization induced by the aforementioned grafted epoxy resin component(s). As an added benefit, the polymer modified vinyl ester resin compositions of the present invention do not require a separate addition and blending step for the vinyl terminated urethane oligomer component and its overall compatibility (i.e. degree of phase separation) is more easily controlled.

SUMMARY OF THE INVENTION

The polymer modified epoxy resin compositions of the present invention comprise a copolymerization product of (A) from about one to about 99, preferably from about 25 to about 95, most preferably from about 50 to about 90, percent by weight (% bw) of at least one epoxy resin wherein from about 0.01 to about 10, preferably from about 0.05 to about 6, most preferably from about 0.1 to about 3 mole percent of the epoxide groups have been reacted to provide groups containing polymerizable ethylenic unsaturation;

(B) from about one to about 99, preferably from about 5 to about 75, most preferably from about 10 to about 50, % bw of at least one vinyl terminated urethane oligomer; and (C) from zero to about 75, preferably from zero to about 50, most preferably from zero to about 40, % bw of one or more polymerizable ethylenically unsaturated compounds.

DETAILED DESCRIPTION OF THE INVENTION

The polymer modified vinyl ester compositions of the present invention can be prepared by reaction of (A) a polymer modified epoxy resin, and (B) a monounsaturated monocarboxylic acid wherein a ratio of epoxide groups to acid (—COOH) groups of about 0.7:1 to about 1.2:1, preferably about 0.9:1 to about 1:1, most preferably 0.96:1 to about 1:1 is used to prepare the polymer modified vinyl ester product. Said vinyl ester compositions can be blended with one or more polymerizable ethylenically unsaturated compounds.

Suitable epoxy resins useful in the preparation of the polymer modified epoxy resin compositions are represented by formulas

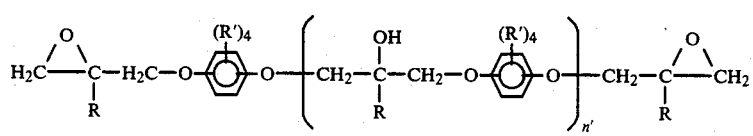

(I)

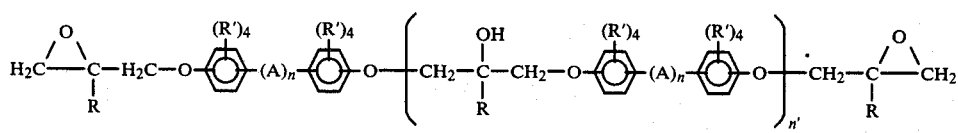

(II)

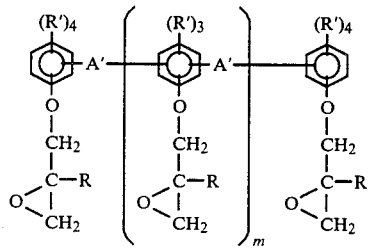

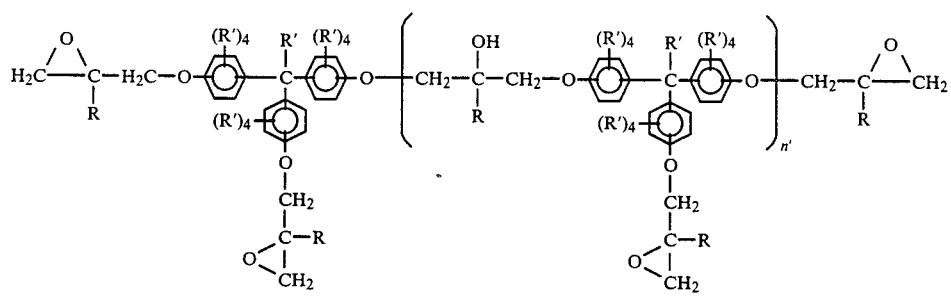

wherein A is a divalent hydrocarbon group having from 1 to about 12, preferably from 1 to about 6 carbon atoms,

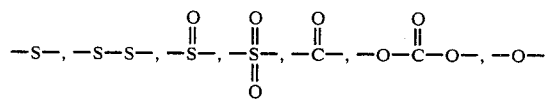

and the like; A' is a divalent hydrocarbon group having from 1 to about 3, preferably 1, carbon atoms or a

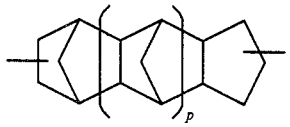

group; p has a value of from zero to about 10, preferably from zero to 3; each R' is independently hydrogen, a hydrocarbyl or hydrocarbyloxy group having from 1 to about 10 carbon atoms or a halogen, preferably chlorine or bromine; R is independently hydrogen or a hydrocarbyl group having from 1 to about 3 carbon atoms; n has a value of zero or 1; n' has a value of zero to about 40, preferably from 0.1 to about 5; and m has a value of from about 0.001 to about 6.

The term hydrocarbyl as employed herein means any aliphatic, cycloaliphatic, aromatic, aryl substituted aliphatic or aliphatic substituted aromatic groups. Likewise, the term hydrocarbyloxy group means a hydrocarbyl group having an oxygen linkage between it and the object to which it is attached.

Suitable compounds which are reacted with one or more of the epoxy resins represented by formulas I, II, III and IV include most any compound possessing a group reactive with an epoxide group and a polymerizable ethylenically unsaturated group. Representative of said compounds are the alkenylphenols such as p-isopropenylphenol, m-vinylphenol, 4-isopropenyl-2-methylphenol, p-allylphenol, o-allylphenol; the acrylic acids such as acrylic acid, methacrylic acid; the allyl alcohols such as allyl alcohol, methallyl alcohol; the hydroxyalkylacrylates such as 2-hydroxyethyl acrylate, 2-hydroxypropyl acrylate, 2-hydroxyethyl methacrylate; the aminoalkylacrylates such as t-butylaminoethyl methacrylate; the monoesterified $\alpha,\beta$-unsaturated dicarboxylic acids such as fumaric acid methyl monoester, maleic acid ethylmonoester, itaconic acid methyl monoester; the alkenylphenyl glycidyl ethers such as p-isopropenylphenyl glycidyl ether, m-vinylphenyl glycidyl ether; the glycidyl acrylates such as glycidyl acrylate, glycidyl methacrylate; and the acrylamides such as acrylamide, methacrylamide, mixtures thereof and the like. Most preferred as the compound for reaction with one or more of the epoxy resins is methacrylic acid or acrylic acid.

A suitable catalyst is optionally, although preferably, employed to facilitate reaction of the aforesaid compound and the epoxy resin. Said catalysts are well known and include, for example, quaternary ammonium salts and phosphonium salts useful for the reaction of alkenylphenols and hydroxyalkylacrylates with the epoxide group. As an additional specific example, catalysts useful for the reaction of acrylic acids and monoesterified $\alpha,\beta$-unsaturated dicarboxylic acids with the epoxide group include phosphonium salts such as ethyltriphenylphosphonium acetate.acetic acid complex, tertiary amines such as tris(dimethylaminoethyl)phenol, and metal salts such as chromium trichloride and chromium acetate. If desired, it is possible to incorporate a polymerization inhibitor into the reaction mixture in order to reduce the possibility of premature vinyl polymerization of the ethylenically unsaturated groups prior to completion of reaction of the carboxylic acid groups and epoxide groups. Examples of such inhibitors include hydroquinone and 2,6-di-tertiarybutyl-4-methylphenol. Said catalysts are typically used in amounts of from about 0.1 to about 2 percent by weight of the total reactants used.

The epoxy resin wherein a portion of the epoxide groups have been converted to groups containing polymerizable ethylenic unsaturated are most preferably prepared in situ by reaction of a compound possessing a group reactive with an epoxide group and a polymerizable ethylenically unsaturated group. The resulting product is an epoxy resin wherein a portion of the epoxide groups have been converted to groups containing polymerizable ethylenic unsaturation. Alternately, the epoxy resin wherein a portion of the epoxide groups have been converted to groups containing polymerizable ethylenic unsaturation can be prepared separately and added to an epoxy resin before or during addition and copolymerization with the vinyl terminated urethane oligomer and, optionally, the polymerizable ethylenically unsaturated compound.

In a typical example, 1 mole of a diglycidyl ether of bisphenol A represented by formula II wherein

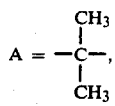

$n=1$, R and $R'=$-H, $n'=0.1$ is heated to 115° C. then a mixture of 0.04 mole of methacrylic acid and 5 percent by weight based on methacrylic acid of ethyltriphenylphosphonium acetate.acetic acid complex as a 70% solution in methanol are added dropwise over a 5 minute (300 s) period. The reaction is maintained at the 115° C. reaction temperature for an additional 45 minutes (2700 s) after which time, epoxy resin is recovered wherein a portion of the epoxide groups have been converted to groups containing polymerizable ethylenic unsaturation of the following structure:

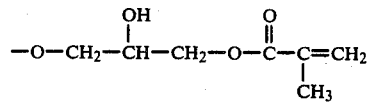

The vinyl terminated urethane oligomer component is a polyglycol moiety-comprising urethane oligomer having end groups of which at least one is vinyl-reactive (i.e., contains a polymerizable ethylenically unsaturated group). Vinyl terminated urethane oligomers of the aforementioned type taught by U.S. Pat. Nos. 3,297,745; 4,360,653; 4,390,662 and Japanese Pat. No. 57,745 are generally suitable for the practice of the present invention. Similar oligomers in which the end groups are incorporated as hydroxyalkylacrylate-initiated polyols are also useful in preparation of the vinyl terminated urethane oligomers.

Also suitable vinyl terminated urethane oligomers are the bis(N-vinylcarbamates) formed by the reaction of an unsaturated isocyanate with a polyol. Suitable such isocyanates are vinyl isocyanate and isopropenyl isocyanate as taught by Example 8 of U.S. Pat. No. 3,598,866. Similarly, polyadducts of isocyanatoethyl methacrylate, allyl isocyanate, allyl isothiocyanate, allyl glycidyl ether, or alkenylphenyl glycidyl ethers such as p-isopropenylphenyl glycidyl ether with polyols also may be used as the vinyl terminated urethane oligomer component.

The vinyl terminated urethane oligomer component of the compositions of the present invention alternatively may be of the novel type described in U.S. Pat. No. 4,486,582 which is incorporated herein by reference. This type of vinyl terminated urethane oligomer is prepared by the reaction of a vinyl- or acryloxy-substituted phenol or phenol-initiated polyol with at least one of the terminal isocyanate (or isothiocyanate) groups in a urethane oligomer formed by reaction of an excess of a difunctional isocyanate (or isothiocyanate) with a polyol. The preferred vinylsubstituted phenol for this purpose is p-isopropenylphenol. However, such other phenols as cresols ring-substituted with ethenyl, allyl or isopropenyl groups are also suitable and the polyol portion of the molecule may be terminated by an —NH$_2$ group.

The most generally suitable vinyl terminated urethane oligomers presently known are reaction products of (1) a diisocyanate, (2) a hydroxyalkylacrylate or aminoalkylacrylate and (3) a polyol or amino-capped polyol. In these vinyl terminated urethane oligomers, the alkyl portion of the hydroxyalkylacrylate or aminoalkylacrylate may be interrupted by one or more oxygen or sulfur atoms, i.e., the hydroxy-substituted acrylate may be a monoacrylate of diethylene- or tripropylene glycol, for example. Also, N-methylol acrylamide may be employed in place of a hydroxyalkylacrylate as a source of vinyl end groups in such vinyl terminated urethane oligomers.

In each of the several foregoing types of unsaturated adducts, the polyol moiety preferably is derived from a diol by base catalyzed reaction with an alkylene oxide but may also be based on a triol such as glycerine or triethanolamine, for example. Since the isocyanate group will react with —NH as well as with —OH (or —SH) groups, the polyol units may be amino-capped or a combination of amino- and hydroxyl-capped.

Preferably the vinyl terminated urethane oligomers have at least two vinyl-reactive end groups. However, this is not indispensable; vinyl terminated urethane oligomers having only one vinyl-reactive end group are considered suitable for the practice of the present invention and are preferred for copolymerization with an epoxy resin wherein a portion of the epoxide groups of an epoxy resin represented by formulas III or IV have been converted to groups containing polymerizable ethylenic unsaturation. On the other hand, a total of three vinyl groups, resulting from use of a triol-based polyol is advantageous for copolymerization with an epoxy resin wherein a portion of the epoxide groups of an epoxy resin represented by formulas I or II have been converted to groups containing polymerizable ethylenic unsaturation.

A most preferred vinyl terminated urethane oligomer is prepared from one molecular proportion of an about 2000 molecular weight polypropylene glycol, about 1.7 to 2 molecular proportions of a monomeric diisocyanate and about 2 molecular proportions of a hydroxyalkylacrylate or methacrylate, in either of two reaction sequences. In one reaction sequence, the glycol and diisocyanate are reacted with each other before the hydroxyalkylacrylate is added. Alternately, the hydroxyalkylacrylate and diisocyanate are first reacted with each other then the glycol is added. This latter reaction sequence is used to produce a vinyl terminated urethane oligomer of lower average molecular weight.

In a typical example, 2.4 moles of toluene diisocyanate and 1.2 moles of a 2000 molecular weight polypropylene glycol are reacted together then the resulting product is reacted with 2.4 moles of 2-hydroxyethyl acrylate. The resulting vinyl terminated urethane oligomer was found to have an average molecular weight of 7681 (polystyrene equivalent). When 0.8 mole of the same diisocyanate was prereacted with 0.8 mole of the same acrylate and then 0.4 mole of the same glycol was reacted, the resulting vinyl terminated urethane oligomer was found to have an average molecular weight of 5132 (polystyrene equivalent). It is also operable to simultaneously react the diisocyanate, glycol and hydroxyalkylacrylate components. In any case, the reactant ratio in the initial condensation must be controlled to insure the presence of the requisite unconverted isocyanate end-groups in the intermediate product.

When a polymerizable ethylenically unsaturated compound is used in the preparation of the polymer modified epoxy resin compositions, it is most preferred to utilize a monovinyl terminated urethane oligomer. A most preferred monovinyl terminated urethane oligomer is prepared from one molecular proportion of an about 2000 molecular weight polypropylene glycol, about one molecular proportion of a monomeric diisocyanate, about one molecular proportion of a hydroxyalkylacrylate or methacrylate and about one molecular proportion of a monomeric monoisocyanate. In the most preferred reaction sequence, the glycol and monoisocyanate are reacted with each other followed by reaction with the diisocyanate, then reaction with the hydroxyalkylacrylate.

An equally preferred monovinyl terminated urethane oligomer is prepared from one molecular proportion of an about 2000 molecular weight polypropylene glycol, about two molecular proportions of a monomeric diisocyanate, about one molecular proportion of a hydroxyalkylacrylate or methacrylate and about one molecular proportion of a compound containing one —OH, —NH$_2$, —NH or —SH group which is reactive with the isocyanate group. In the most preferred reaction sequence, the glycol and diisocyanate are reacted with each other followed by reaction with the compound containing one —OH, —NH$_2$, —NH or —SH group which is reactive with the isocyanate group, then reaction with the hydroxyalkylacrylate.

In a typical example, 1.2 moles of toluene diisocyanate and 0.6 mole of a 2000 molecular weight polypropylene glycol are reacted together then the resulting product is reacted with 0.6 mole of tripropylene glycol monomethyl ether and 0.6 mole of 2-hydroxyethyl acrylate.

A suitable catalyst is optionally, although preferably, employed to facilitate reaction of the diisocyanate, glycol and hydroxyalkylacrylate components. Said catalysts are well known in polyurethane chemistry and include, for example, metal salts of carboxylic acids such as stannous octoate, lead octoate, dibutyl tin laureate and hindered tertiary amines such as diazabicycloundecane, triethylenediamine, mixtures thereof and the like. If desired, it is possible to incorporate a polymerization inhibitor into the reaction mixture as previously described. Said catalysts are typically used in amounts of from about 0.1 to about 2 percent by weight.

Suitable polymerizable ethylenically unsaturated compounds optionally used in the preparation of the polymer modified epoxy resin compositions include vinyl aromatic monomers such as, for example, styrene, vinyl toluenes, t-butyl styrenes, divinylbenzenes, vinyl naphthalene, chlorostyrene, α-methylstyrene, and acrylate monomers such as, for example, n-butyl acrylate, sec-butyl acrylate, dicyclopentadienyl acrylate, 2-ethylhexyl acrylate, 2-ethylhexyl methacrylate, ethyl acrylate, cyclohexyl acrylate and allyl monomers, such as, for example, diallyl phthalate, mixtures thereof and the like. Thus, suitable polymerizable ethylenically unsaturated compounds generally are those commonly copolymerized with monomers having terminal or pendant, vinyl-reactive, olefinic or cycloolefinic double bonds. Such monomers are well catalogued in the prior art.

A suitable catalyst is optionally, although preferably, employed to facilitate copolymerization of (A) the epoxy resin wherein a portion of the epoxide groups have been converted to groups containing polymerizable ethylenic unsaturation, (B) the vinyl terminated urethane oligomer and, optionally, (C) the polymerizable ethylenically unsaturated compound. Said catalysts are the well known free radical-forming catalysts and include, for example, the organic peroxides and hydroperoxides, such as benzoyl peroxide, di-tert-butyl peroxide, t-butyl peroxybenzoate, t-butylhydroperoxide and the azo and diazo compounds, such as azobisisobutyronitrile. It is also operable to use mixtures of said free radical-forming catalysts. Said catalysts are typically used in amounts of from about 0.1 to about 5 percent by weight.

Reaction temperatures of from about 40° C. to about 175° C. are used for the copolymerization with temperatures of from about 80° C. to about 120° C. being preferred.

Reaction times of from about 15 minutes (900 s) to about 8 hours (28,800 s) are used for the copolymerization with times of from about 30 minutes (1800 s) to about 4 hours (14,400 s) being preferred.

The copolymerization can also be carried out with an inert organic solvent present although this is not generally preferred. Almost any solvent can be used, provided it does not interfere with the copolymerization. Representative solvents include xylene, toluene, methyl chloroform and the like. Any solvent, if used, is preferably removed before further conversion of the copolymerization product to a vinyl ester.

The copolymerization can also be carried out in the presence of from about 0.01 to about 2 percent by weight of a chain transfer agent although this is not generally preferred. Representative chain transfer agents include the alkyl mercaptans, such as butyl mercaptan, stearyl mercaptan; the disulfides and halogenated compounds, especially those containing bromine.

The polymerizable ethylenically unsaturated compound optionally used in the preparation of the polymer modified epoxy resin compositions can be preblended with the vinyl terminated urethane oligomer then added to the epoxy resin wherein a portion of the epoxide groups has been converted to groups containing polymerizable ethylenic unsaturation. Alternately, either the polymerizable ethylenically unsaturated compound or the vinyl terminated urethane oligomer may be first added to the epoxy resin wherein a portion of the epoxide groups has been converted to groups containing polymerizable ethylenic unsaturation. The additions may be made in aliquots or continuously.

The product resulting from the copolymerization is a polymer modified epoxy resin containing chemically bonded residues derived from the vinyl terminated urethane oligomer and, optionally the polymerizable ethylenically unsaturated compound. Said product also may contain (non-chemically bonded) homo and copolymers of the vinyl terminated urethane oligomer and the polymerizable ethylenically unsaturated compound, if used.

Suitable curing agents for curing epoxy resins are described in the *Handbook of Epoxy Resins* by Lee and Neville, McGraw-Hill, (1967), which is incorporated herein by reference.

The polymer modified epoxy resin compositions of the present invention are also well suited for advancement reaction with a polyphenol, such as bisphenol A, to provide polymer modified advanced epoxy resins. Advancement reaction of epoxy resins is well known in the art and is described in the aforementioned *Handbook of Epoxy Resins*.

The polymer modified vinyl ester compositions are prepared by reacting at least one polymer modified epoxy resin with a monounsaturated monocarboxylic acid or a mixture of said acids. The reaction is preferably conducted in the presence of a suitable quantity of a suitable catalyst.

Suitable monounsaturated monocarboxylic acids for reaction with the polymer modified polyepoxides include acrylic acid, methacrylic acid, cyanoacrylic acid, crotonic acid, α-phenylacrylic acid, methoxyacrylic acid, cinnamic acid and the like or mixtures thereof. Methacrylic acid is a most preferred monounsaturated monocarboxylic acid. The reaction between the polymer modified polyepoxide and a monounsaturated monocarboxylic acid is typically performed in the presence of a catalyst. Suitable catalysts for use herein are well known in the prior art. Chromium trichloride, tris(dimethylaminoethyl)phenol and ethyltriphenylphosphonium acetate.acetic acid complex are most preferred as the catalysts. A quantity of from about 0.01 to about 2 percent by weight has been found to be a particularly suitable quantity of catalyst with concentrations of about 0.1 to about 0.3 weight percent of the total reactants used being most preferred.

A suitable process inhibitor is typically used in the reaction between the polymer modified epoxy resin and a monounsaturated monocarboxylic acid to prevent gelation (homopolymerization of the vinyl ester and/or copolymerization of the vinyl ester with unreacted monounsaturated monocarboxylic acid). Suitable inhibitors for use herein are well known in the prior art. Hydroquinone activated with air is a most preferred inhibitor at concentrations of from about 100 ppm to about 500 ppm based on the weight of the polymer modified epoxy resin and monounsaturated monocarboxylic acid used.

The reaction to produce the polymer modified vinyl ester is usually conducted at a temperature of from about 50° C. to about 125° C., preferably from about 80° C. to about 120° C. for from about 120 minutes (7200 s) to about 720 minutes (43,200 s), preferably from about 240 minutes (14,400 s) to about 480 minutes (28,800 s). Although reaction times and reaction temperatures can vary substantially, most preferred vinyl ester compositions are obtained by reacting to a specific conversion, typically 1.5 to 0.25 percent carboxylic acid.

The polymer modified vinyl ester is typically combined with one or more reactive diluents, such as polymerizable ethylenically unsaturated monomers. Representative species of said monomers suitable for this use include those previously described herein. Most preferred as the monomer is styrene.

The blended polymer modified vinyl ester resin may consist of up to 99 percent by weight of polymerizable ethylenically unsaturated monomer with the balance of the combined weight consisting of said polymer modified vinyl ester. Preferably, the resin composition consists of about 30 to about 70 percent by weight of said monomer and about 70 to about 30 percent by weight of said vinyl ester.

While it is preferred in many applications to blend the polymer modified vinyl ester with a polymerizable monomer, the present invention is not limited thereto. The polymer modified vinyl ester can be cured (homopolymerized) in the absence of such a monomer and can be applied and utilized as solutions in a non-polymerizable solvent, such as is practiced in certain coating operations.

According to the present invention, the curing of the resin compositions is effected by the application of heat and/or pressure, preferably in the presence of a free radical-forming catalyst of the type previously described herein. The amount of catalyst added is preferably from about 0.5 to about 2 percent by weight of the resin. Temperatures employed may vary over a considerable range but usually are in the range of 20° C. to 250° C., preferably 25° C. to 120° C. Known gel retarding agents, such as p-benzoquinone, can be employed in the curing system.

Additionally, more rapid curing of the thermosetting resin compositions may be accomplished by the addition of accelerating agents such as lead or cobalt naphthenate, N,N-dimethylaniline, and the like, usually in concentrations ranging from about 0.01 to about 2 percent by weight of the resin.

Additional compositions of the present invention also include blends of the polymer modified vinyl ester resins and vinyl ester resins of the prior art, as well as the cured compositions from said blends. Representative of said prior art vinyl ester resins include those taught by U.S. Pat. Nos. 3,367,992; 3,066,112; 3,179,623; 3,301,743 and 3,256,226 which are incorporated herein by reference.

Both the polymer modified epoxy resins and the polymer modified vinyl ester resins of the present invention are useful to make laminates, castings, coatings, encapsulations and the like. The laminates are made by curing the polymer modified epoxy resin or polymer modified vinyl ester resin to which a suitable fibrous reinforcement such as asbestos fibers, carbon fibers, fibrous glass, aramid fibers or inorganic fibers have been added. The fibers may be in the form of mats, strands, sheets, filaments, yarns, chopped strands, ribbons, and the like. The polymer modified epoxy resin or polymer modified vinyl ester resin formulation can be rolled, sprayed or impregnated into the fibrous reinforcement.

The polymer modified epoxy resins or polymer modified vinyl ester resins may be compounded with solvents, pigments, fire suppressants, low profile additives, fillers or other resinous products and cured to form useful coatings in a manner well known in the art.

The compositions of the present invention have properties that make them well adapted for molding, pultrusion, filament winding, injection molding and other known fabrication procedures. A preferred use is in fabricated parts where improved toughness is necessary yet a high degree of corrosion resistance and processability are still required. Typical of these applications are pultrusion-formed oil well sucker rods as well as filament wound large and small diameter pipe.

The following examples are illustrative of the invention, but are not to be construed as to limiting the scope thereof in any manner.

EXAMPLE 1

A. Preparation of a Vinyl Terminated Urethane Oligomer From a Polypropylene Glycol, Toluene Diisocyanate and 2-Hydroxyethyl Acrylate Toluene diisocyanate (2.4 moles, 417.93 grams) and phenothiazine (200 ppm, 0.63 gram) were added to a reactor and maintained with stirring at 23° C. under a nitrogen atmosphere. The toluene diisocyanate used was an 80 to 20 weight percent mixture of the 2,4-and 2,6-isomers, respectively. Polypropylene glycol having an average molecular weight of 2000 (1.2 moles of hydroxyl groups, 2400 grams) was mixed with stannous octoate catalyst (550 ppm, 1.73 grams) and triethylene diamine as a 33% by weight solution in dipropylene glycol commercially available from Air Products as Dabco 33LV (550 ppm, 1.73 grams) and this mixture was added to the reactor over a 24 minute (1440 s) period. A maximum exotherm of 55° C. was obtained at the end of the polypropylene glycol and catalyst addition, then heating commenced and a reaction temperature of 65° C. was achieved fourteen minutes (840 s) later. The reaction was allowed to progress for 62 minutes (3720 s) at 65° C. after which time infrared spectrophotometric analysis of a film sample of the reaction product demonstrated essentially complete reaction (disappearance of hydroxyl group absorbance). At this time, 2-hydroxyethyl acrylate (2.4 moles, 278.67 grams) was added to the reactor over a one minute (60 s) period. A maximum exotherm of 76° C. occurred seven minutes (420 s) later. The reaction was continued at a 75° C. reaction temperature for an additional 60 minutes (3600 s) after which time infrared spectrophotometric analysis of a film sample of the reaction product demonstrated essentially complete reaction (disappearance of isocyanate group absorbance). The product was recovered as a transparent, viscous liquid of the following statistical structure:

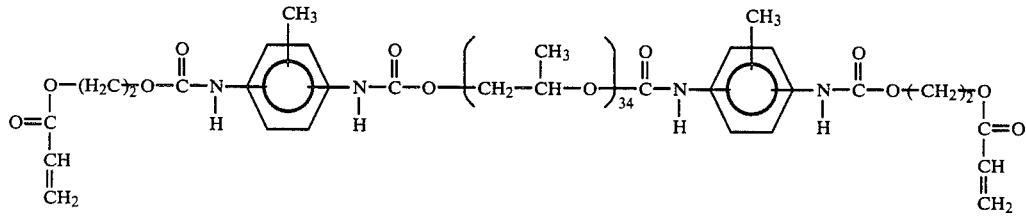

B. Preparation of a Trifunctional-type Epoxy Resin Modified with a Vinyl Terminated Urethane Oligomer A portion (1200 grams) of a triglycidyl ether of tris(-hydroxyphenyl)methane having an epoxide equivalent weight (EEW) of 169.03 was added to a reactor and heated with stirring until a temperature of 115° C. was achieved. At this time, a mixture of glacial methacrylic acid (0.0852 mole, 7.33 grams) and ethyltriphenylphosphonium acetate.acetic acid complex (70% by weight solution in methanol) catalyst (5 percent by weight of methacrylic acid used, 0.367 gram) was added to the reactor, then the reaction was allowed to progress for 45 minutes (2700 s) at the 115° C. reaction temperature. After completion of the reaction, a nitrogen atmosphere was established in the reactor and azobisisobutyronitrile catalyst (0.2 percent by weight of methacrylic acid and vinyl terminated urethane oligomer used, 0.31 gram) was added to the reactor, then two minutes (120 s) later, a portion (148.32 grams) of the vinyl terminated urethane oligomer prepared in A above was added to the reactor. The reaction was continued at the 115° C. reaction temperature for an additional 60 minutes (3600 s) then the oligomer modified epoxy resin was recovered as a light yellow colored, opaque solid with an EEW of 195.28.

C. Preparation of Vinyl Ester Resin Modified with a Vinyl Terminated Urethane Oligomer A portion (1010.5 grams) of the epoxy resin modified with a vinyl terminated urethane oligomer from B above was added to a reactor and heated to 90° C. When the 90° C. reaction temperature was achieved, an air sparge was started (0.5 liter per minute) then hydroquinone (400 ppm, 0.58 gram) and glacial methacrylic acid (5.01 mole, 431.4 grams) were sequentially added. After 5 minutes (300 s), 2,4,6-tris(N,N-dimethylaminomethyl)phenol (0.1 percent by weight, 1.52 grams) and 33.3 percent aqueous chromium trichloride (0.03 percent by weight, 0.45 gram) were added to the reactor then the reaction temperature was increased to 105° C. After 5 minutes (300 s) at the 105° C. reaction temperature, the temperature was increased to 115° C. After 390 minutes (23,400 s) of reaction at the 115° C. temperature, titration of a sample of the vinyl ester demonstrated the presence of 1.01 percent carboxylic acid and 1.02 percent epoxide. Oxalic acid (300 ppm, 0.45 gram) and styrene (310 grams) were added to the reactor. When the reaction temperature reached 80° C., phenothiazine (400 ppm, 0.58 gram) and additional styrene (310 grams) were added to the reactor to provide a total of 30 weight percent styrene. The vinyl ester resin was recovered as a transparent, light amber colored liquid.

COMPARATIVE EXPERIMENT A

Preparation of Vinyl Ester Resin

A portion (900 grams) of a triglycidyl ether of tris(hydroxyphenyl)methane having an epoxide equivalent weight (EEW) of 169.03 was added to a reactor and heated to 90° C. When the 90° C. reaction temperature was achieved, an air sparge was started (0.5 liter per minute) then hydroquinone (400 ppm, 0.54 gram) and glacial methacrylic acid (5.17 mole, 444.6 grams) were sequentially added. After 5 minutes (300 s), 2,4,6-tris(N,N-dimethylaminomethyl)phenol (0.1 percent by weight, 1.35 grams) and 33.3 percent aqueous chromium trichloride (0.03 percent by weight, 0.41 gram) were added to the reactor then the reaction temperature was increased to 105° C. After 5 minutes (300 s) at the 105° C. reaction temperature, the temperature was increased to 115° C. After 420 minutes (25,200 s) of reaction at the 115° C. temperature, titration of a sample of the vinyl ester demonstrated the presence of 1.09 percent carboxylic acid and 1.08 percent epoxide. Oxalic acid (300 ppm, 0.41 gram) and styrene (289 grams) were added to the reactor. When the reaction temperature reached 80° C., phenothiazine (400 ppm, 0.54 gram) and additional styrene (289 grams) were added to the reactor to provide a total of 30 weight percent styrene. The vinyl ester resin was recovered as a transparent, light amber colored liquid.

EXAMPLE 2

A. Preparation of a Novolac-type Epoxy Resin Modified with a Vinyl Terminated Urethane Oligomer (8.0 weight percent)

A portion (1000 grams) of a polyglycidyl ether of a phenol and formaldehyde condensation product (novolac) having an epoxide equivalent weight (EEW) of 178.5 was added to a reactor and heated with stirring until a temperature of 115° C. was achieved. At this time, a mixture of glacial methacrylic acid (0.0502 mole, 4.32 grams) and ethyltriphenylphosphonium acetate.acetic acid complex (70% in methanol) catalyst (5 percent by weight of methacrylic acid used, 0.216 gram) was added to the reactor, then the reaction was allowed to progress for 45 minutes (2700 s) at the 115° C. reaction temperature. After completion of the reaction, the reactor was cooled to 110° C. over a 7 minute (420 s) period, a nitrogen atmosphere was established, and azobisisobutyronitrile catalyst (0.2 percent by weight of methacrylic acid and vinyl terminated urethane oligomer used, 0.184 gram) was added to the reactor. Two minutes (120 s) later, a portion (87.5 grams) of the vinyl terminated urethane oligomer from Example I-A was added to the reactor. The reaction was continued at the 110° C. reaction temperature for an additional 60 minutes (3600 s) then the oligomer modified epoxy resin was recovered as a light yellow colored, opaque solid with an EEW of 197.9.

B. Preparation of Vinyl Ester Resin Modified with a Vinyl Terminated Urethane Oligomer A portion (1065 grams) of the epoxy resin modified with a vinyl terminated urethane oligomer from A above was added to a reactor and heated to 90° C. When the 90° C. reaction temperature was achieved, an air sparge was started (0.5 liter per minute) then hydroquinone (400 ppm, 0.61 gram) and glacial methacrylic acid (5.21 moles, 448.9 grams) were sequentially added. After 5 minutes (300 s), 2,4,6-tris(N,N-dimethylaminomethyl)phenol (0.1 percent by weight, 1.6 grams) and 33.3 percent aqueous chromium trichloride (0.03 percent by weight, 0.45 gram) were added to the reactor then the reaction temperature was increased to 105° C. After 5 minutes (300 s) at the 105° C. reaction temperature, the temperature was increased to 115° C. After 585 minutes (35,100 s) of reaction at the 115° C. temperature, titration of a sample of the vinyl ester demonstrated the presence of 1.16 percent carboxylic acid and 1.13 percent epoxide. Oxalic acid (300 ppm, 0.47 gram) and styrene (325 grams) were added to the reactor. When the reaction temperature reached 80° C., phenothiazine (400 ppm, 0.61 gram) and additional styrene (325 grams) were added to the reactor to provide a total of 30 weight percent styrene. The vinyl ester resin was recovered as a transparent, light amber colored liquid.

EXAMPLE 3

A. Preparation of a Novolac-type Epoxy Resin Modified with a Vinyl Terminated Urethane Oligomer (13.9 weight percent)

A portion (1200 grams) of a polyglycidyl ether of a phenol and formaldehyde condensation product (novolac) having an epoxide equivalent weight (EEW) of 178.5 was added to a reactor and heated with stirring until a temperature of 115° C. was achieved. At this time, a mixture of glacial methacrylic acid (0.1121 mole, 9.65 grams) and ethyltriphenylphosphonium acetate.acetic acid complex (70% by weight in methanol) catalyst (5 percent by weight of methacrylic acid used, 0.483 gram) was added to the reactor, then the reaction was allowed to progress for 45 minutes (2700 s) at the 115° C. reaction temperature. After completion of the reaction, the reactor was cooled to 110° C. over a ten minute (600 s) period, a nitrogen atmosphere was established, and azobisisobutyronitrile catalyst (0.2 percent by weight of methacrylic acid and vinyl terminated urethane oligomer used, 0.41 gram) was added to the reactor. Two minutes (120 s) later, a portion (195.35 grams) of the vinyl terminated urethane oligomer from Example I-A was added to the reactor. The reaction was continued at the 110° C. reaction temperature for an additional 60 minutes (3600 s) then the oligomer modified epoxy resin was recovered as a light yellow colored, opaque solid with an EEW of 212.8.

B. Preparation of Vinyl Ester Resin Modified with a Vinyl Terminated Urethane Oligomer A portion (1003 grams) of the epoxy resin modified with a vinyl terminated urethane oligomer from A above was added to a reactor and heated to 90° C. When the 90° C. reaction temperature was achieved, an air sparge was started (0.5 liter per minute) then hydroquinone (400 ppm, 0.57 gram) and glacial methacrylic acid (4.8 moles, 412.9 grams) were sequentially added. After 5 minutes (300 s), 2,4,6-tris(N,N-dimethylaminomethyl)phenol (0.1 percent by weight, 1.5 grams) and 33.3 percent aqueous chromium trichloride (0.03 percent by weight, 0.44 gram) were added to the reactor then the reaction temperature was increased to 105° C. After 5 minutes (300 s) at the 105° C. reaction temperature, the temperature was increased to 115° C. After 390 minutes (23,400 s) of reaction at the 115° C. temperature, titration of a sample of the vinyl ester demonstrated the presence of 1.14 percent carboxylic acid and 0.35 percent epoxide. Oxalic acid (300 ppm, 0.44 gram) and styrene (305 grams) were added to the reactor. When the reaction temperature reached 80° C., phenothiazine (400 ppm, 0.57 gram) and additional styrene (305 grams) were added to the reactor to provide a total of 30 weight percent styrene. The vinyl ester resin was recovered as a transparent, light yellow colored liquid.

EXAMPLE 4

A. Preparation of a Novolac type Epoxy Resin Modified with a Vinyl Terminated Urethane Oligomer (13.8 weight percent) Plus Increased Methacrylic Acid The preparation of Example 3-A was repeated with the exception that the glacial methacrylic acid was increased (0.2141 mole, 18.43 grams), azobisisobutyronitrile was increased (0.2 percent by weight of methacrylic acid and vinyl terminated urethane oligomer used, 0.43 gram) and ethyltriphenylphosphonium acetate.acetic acid complex (70% by weight in methanol) catalyst (5 percent by weight of methacrylic acid used, 0.922 gram) was increased. The oligomer modified epoxy resin was recovered as a light yellow colored, opaque solid with an EEW of 217.72.

B. Preparation of Vinyl Ester Resin Modified with a Vinyl Terminated Urethane Oligomer A portion (1001 grams) of the epoxy resin modified with a vinyl terminated urethane oligomer from A above was added to a reactor and heated to 90° C. When the 90° C. reaction temperature was achieved, an air sparge was started (0.5 liter per minute) then hydroquinone (400 ppm, 0.55 gram) and glacial methacrylic acid (4.46 moles, 383.8 grams) were sequentially added. After 5 minutes (300 s), 2,4,6-tris(N,N-dimethylaminomethyl)phenol (0.1 percent by weight, 1.5 grams) and 33.3 percent aqueous chromium trichloride (0.03 percent by weight, 0.45 gram) were added to the reactor then the reaction temperature was increased to 105° C. After 5 minutes (300 s) at the 105° C. reaction temperature, the temperature was increased to 115° C. After 330 minutes (19,800 s) of reaction at the 115° C. temperature, titration of a sample of the vinyl ester demonstrated the presence of 1.02 percent carboxylic acid and 0.88 percent epoxide. Oxalic acid (300 ppm, 0.43 gram) and styrene (297 grams) were added to the reactor. When the reaction temperature reached 80° C., phenothiazine (400 ppm, 0.55 gram) and additional styrene (297 grams) were added to the reactor to provide a total of 30 weight percent styrene. The vinyl ester resin was recovered as a transparent, light yellow colored liquid.

EXAMPLE 5

A. Preparation of a Vinyl Terminated Urethane Oligomer from a Polypropylene Glycol, Toluene Diisocyanate, Phenyl Isocyanate and 2-Hydroxyethyl Acrylate Phenyl isocyanate (0.2 mole, 23.8 grams) and phenothiazine (200 ppm, 0.1 gram) were added to a reactor and maintained with stirring at 22° C. under a nitrogen atmosphere. Polypropylene glycol having an average molecular weight of 2000 (0.4 mole of hydroxyl groups, 400 grams) was mixed with stannous octoate catalyst (550 ppm, 0.265 gram) and a triethylenediamine catalyst (Dabco 33LV) (550 ppm, 0.265 grams) and this mixture was added to the reactor over a 13 minute (780 s) period. A maximum exotherm of 31° C. was obtained at the end of the polypropylene glycol and catalyst addition. The reaction was allowed to progress for 27 minutes (1620 s) at 29° C., after which time infrared spectophotometric analysis of a film sample of the reaction product demonstrated essentially complete reaction (disappearance of isocyanate group absorbance). At this time, toluene diisocyanate (0.2 mole, 34.8 grams) was added to the reactor over a one minute (60 s) period inducing a maximum exotherm of 43° C. nine minutes (540 s) later. Heating commenced and a reaction temperature of 65° C. was achieved 13 minutes (780 s) later. After 35 minutes (2100 s) at the 65° C. reaction temperature, infrared spectrophotometric analysis of a film sample of the reaction product demonstrated essentially complete reaction (disappearance of hydroxyl group absorbance, appearance of isocyanate group absorbance). At this time, 2-hydroxyethyl acrylate (0.2 mole, 23.2 grams) was added to the reactor over a one minute (60 s) period then the temperature controller was set at 75° C. The 75° C. reaction temperature was achieved 20 minutes (1200 s) later and maintained for an additional 27 minutes (1620 s) after which time infrared spectrophotometric analysis of a film sample of the reaction product demonstrated essentially complete reaction (disappearance of isocyanate group absorbance). Hydroquinone (0.025 gram) was added as an inhibitor and the product was recovered as a transparent, viscous liquid of the following statistical structure:

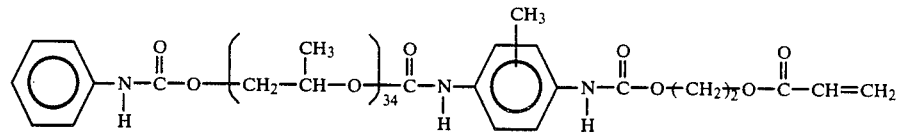

B. Preparation of a Novolac-type Epoxy Resin Modified with a Monovinyl Terminated Urethane Oligomer A portion (1200 grams) of a polyglycidyl ether of a phenol and formaldehyde condensation product (novolac) having an epoxide equivalent weight (EEW) of 178.5 was added to a reactor and heated with stirring until a temperature of 115° C. was achieved. At this time, a mixture of glacial methacrylic acid (0.1821 mole, 15.68 grams) and ethyltriphenylphosphonium acetate.acetic acid complex (70% by weight in methanol) catalyst (5 percent by weight of methacrylic acid used, 0.784 gram) was added to the reactor, then the reaction was allowed to progress for 45 minutes (2700 s) at the 115° C. reaction temperature. After completion of the reaction, the reactor was cooled to 110° C. over a 4 minute (240 s) period, a nitrogen atmosphere was established, and azobisisobutyronitrile catalyst (0.1 percent by weight of methacrylic acid and monovinyl terminated urethane oligomer used, 0.32 gram) was added to the reactor. Two minutes (120 s) later, a portion (300 grams) of the vinyl terminated urethane oligomer from A above was added to the reactor. The reaction was continued at the 110° C. reaction temperature for an additional 60 minutes (3600 s) then the oligomer modified epoxy resin was recovered as a light yellow colored, opaque solid with an EEW of 231.9.

C. Preparation of Vinyl Ester Resin Modified with a Monovinyl Terminated Urethane Oligomer A portion (1001 grams) of the epoxy resin modified with a monovinyl terminated urethane oligomer from B above was added to a reactor and heated to 90° C. When the 90° C. reaction temperature was achieved, an air sparge was started (0.5 liter per minute) then hydroquinone (400 ppm, 0.55 gram) and glacial methacrylic acid (4.19 moles, 360.3 grams) were sequentially added. After 5 minutes (300 s), 2,4,6-tris(N,N-dimethylaminomethyl)phenol (0.1 percent by weight, 1.5 grams) and 33.3 percent aqueous chromium trichloride (0.03 percent by weight, 0.45 gram) were added to the reactor then the reaction temperature was increased to 105° C. After 5 minutes (300 s) at the 105° C. reaction temperature, the temperature was increased to 115° C. After 330 minutes (19,800 s) of reaction at the 115° C. temperature, titration of a sample of the vinyl ester demonstrated the presence of 0.9 percent carboxylic acid and 0.9 percent epoxide. Oxalic acid (300 ppm, 0.43 gram) and styrene (293 grams) were added to the reactor. a transparent, viscous liquid of the following statistical structure:

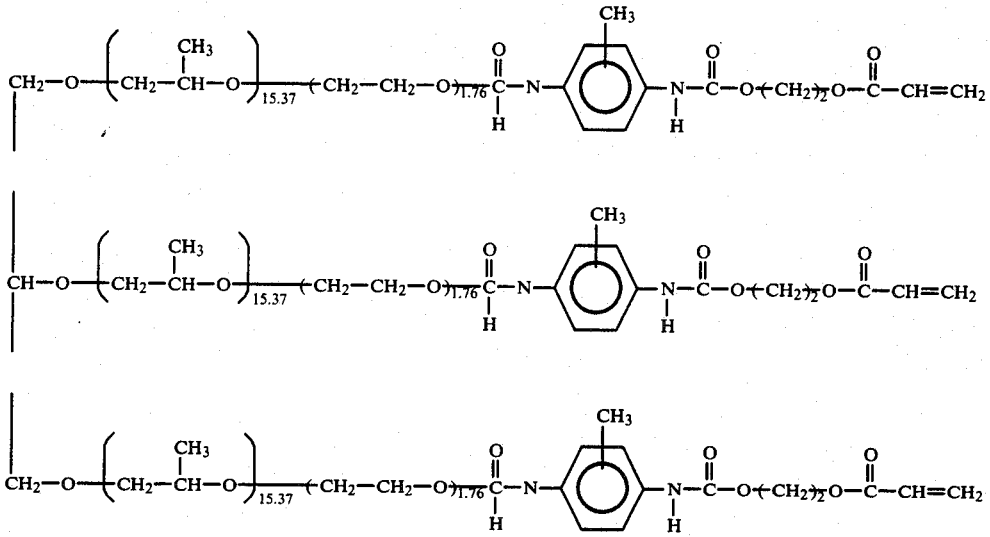

tor. When the reaction temperature reached 80° C., phenothiazine (400 ppm, 0.55 gram) and additional styrene (293 grams) were added to the reactor to provide a total of 30 weight percent styrene. The vinyl ester resin was recovered as a transparent, light yellow colored liquid.

EXAMPLE 6

A. Preparation of a Vinyl Terminated Urethane Oligomer from Hydroxyalkylated Glycerin, Toluene Diisocyanate and 2-Hydroxyethyl Acrylate Toluene diisocyanate (1.2 moles, 208.99 grams) and phenothiazine (200 ppm, 0.31 gram) were added to a reactor and maintained with stirring at 21° C. under a nitrogen atmosphere. The toluene diisocyanate used was an 80 to 20 weight percent mixture of the 2,4-and 2,6-isomers, respectively. Polypropylene (ethylene) glycol adduct of glycerin prepared by reaction of a 92 percent propylene oxide, 8 percent ethylene oxide mixture with glycerin to a 3000 average molecular weight (1.2 moles of hydroxyl groups, 1200 grams) was mixed with stannous octoate (550 ppm, 0.85 gram) and a triethylenediamine catalyst (Dabco 33LV) (550 ppm, 0.85 gram) and this mixture was added to the reactor over a 10 minute (600 s) period. A maximum exotherm of 56° C. was obtained at the end of the hydroxyalkylated glycerin and catalyst addition, then heating commenced and a reaction temperature of 65° C. was achieved six (360 s) minutes later. The reaction was allowed to progress for 75 minutes (4500 s) at 65° C. after which time infrared spectrophotometric analysis of a film sample of the reaction product demonstrated essentially complete reaction (disappearance of hydroxyl group absorbance). At this time, 2-hydroxyethyl acrylate (1.2 moles, 139.27 grams) was added to the reactor over a one minute (60 s) period. A maximum exotherm of 73° C. occurred then the reactor was heated to 76° C. and held at this temperature for 90 minutes (5400 s) after which time infrared spectrophotometric analysis of a film sample of the reaction product demonstrated essentially complete reaction (disappearance of isocyanate group absorbance). Hydroquinone (0.08 gram) was added as an inhibitor and the product was recovered as

Preparation of a Novolac-type Epoxy Resin Modified with a Trivinyl Terminated Urethane Oligomer A portion (1200 grams) of a polyglycidyl ether of a phenol and formaldehyde condensation product (novolac) having an epoxide equivalent weight (EEW) of 178.5 was added to a reactor and heated with stirring until a temperature of 115° C. was achieved. At this time, a mixture of glacial methacrylic acid (0.0658 mole, 5.66 grams) and ethyltriphenylphosphonium acetate.acetic acid complex (70% by weight in methanol) catalyst (5 percent by weight of methacrylic acid used, 0.283 gram) was added to the reactor, then the reaction was allowed to progress for 45 minutes (2700 s) at the 115° C. reaction temperature. After completion of the reaction, the reactor was cooled to 110° C. over a five minute (300 s) period, a nitrogen atmosphere was established, and azobisisobutyronitrile catalyst (0.2 percent by weight of methacrylic acid and vinyl terminated urethane oligomer used, 0.19 gram) was added to the reactor. One minute (60 s) later, a portion (90.32 grams) of the vinyl terminated urethane oligomer from Example 6-A was added to the reactor. The reaction was continued at the 110° C. reaction temperature for an additional 60 minutes (3600 s) then the oligomer modified epoxy resin was recovered as a light yellow colored, opaque solid with an EEW of 194.

C. Preparation of Vinyl Ester Resin Modified with a Trivinyl Terminated Urethane Oligomer A portion (1005 grams of the epoxy resin modified with a trivinyl terminated urethane oligomer from B above was added to a reactor and heated with stirring to 90° C. When the 90° C. reaction temperature was achieved, an air sparge was started (0.5 liter per minute) then hydroquinone (400 ppm, 0.58 gram) and glacial methacrylic acid (5.03 mole, 432.5 grams) were sequentially added. After 5 minutes (300 s), 2,4,6-tris(N,N-dimethylaminomethyl)phenol (0.1 percent by weight, 1.51 grams) and 33.3 percent aqueous chromium trichloride (0.03 percent by weight, 0.45 gram) were added to the reactor then the reaction temperature was increased to 105° C. After 5 minutes (300 s) at the 105°

C. reaction temperature, the temperature was increased to 115° C. After 340 minutes (20,400 s) of reaction at the 115° C. temperature, titration of a sample of the vinyl ester demonstrated the presence of 1.03 percent carboxylic acid and 1.06 percent epoxide. Oxalic acid (300 ppm, 0.45 gram) and styrene (309 grams) were added to the reactor. When the reaction temperature reached 80° C., phenothiazine (400 ppm, 0.58 gram) and additional styrene (309 grams) were added to the reactor to provide a total of 30 weight percent styrene. The vinyl ester resin was recovered as a transparent, light yellow colored liquid.

COMPARATIVE EXPERIMENT B

Preparation of Vinyl Ester Resin

A portion (857 grams) of a polyglycidyl ether of a phenol and formaldehyde condensation product (novolac) having an epoxide equivalent weight (EEW) of 178.5 was added to a reactor and heated to 90° C. When the 90° C. reaction temperature was achieved, an air sparge was started (0.5 liter per minute) then hydroquinone (400 ppm, 0.5 gram) and glacial methacrylic acid (4.65 moles, 400.3 grams) were sequentially added. After 5 minutes (300 s), 2,4,6-tris(N,N-dimethylaminomethyl)phenol (0.1 percent by weight, 1.28 grams) and 33.3 percent aqueous chromium trichloride (0.03 percent by weight, 0.38 gram) were added to the reactor then the reaction temperature was increased to 105° C. After 5 minutes (300 s) at the 105° C. reaction temperature, the temperature was increased to 115° C. After 330 minutes (19,800 s) of reaction at the 115° C. temperature, titration of a sample of the vinyl ester demonstrated the presence of 1.08 percent carboxylic acid and 0.88 percent epoxide. Oxalic acid (300 ppm, 0.39 gram) and styrene (270 grams) were added to the reactor. When the reaction temperature reached 80° C., phenothiazine (400 ppm, 0.5 gram) and additional styrene (270 grams) were added to the reactor to provide a total of 30 weight percent styrene. The vinyl ester resin was recovered as a transparent, light amber colored liquid.

EXAMPLE 7

A. Preparation of a Diglycidyl Ether of Bisphenol A Modified with a Vinyl Terminated Urethane Oligomer A portion (1200 grams) of a diglycidyl ether of bisphenol A having an epoxide equivalent weight (EEW) of 181.5 was added to a reactor and heated with stirring until a temperature of 115° C. was achieved. At this time, a mixture of glacial methacrylic acid (0.0852 mole, 7.33 grams) and ethyltriphenylphosphonium acetate.acetic acid complex (70% in methanol) catalyst (5 percent by weight of methacrylic acid used, 0.37 gram) was added to the reactor, then the reaction was allowed to progress for 45 minutes (2700 s) at the 115° C. reaction temperature. After completion of the reaction, the reactor was cooled to 110° C. over a four minute (240 s) period, a nitrogen atmosphere was established, and azobisisobutyronitrile catalyst (0.2 percent by weight of methacrylic acid and vinyl terminated urethane oligomer used, 0.31 gram) was added to the reactor. Two minutes (120 s) later, a portion (148.32 grams) of the vinyl terminated urethane oligomer from Example 1-A was added to the reactor. The reaction was continued at the 110° C. reaction temperature for an additional 60 minutes (3600 s) then the oligomer modified epoxy resin was recovered as a light yellow colored, transparent liquid with an EEW of 207.

B. Preparation of Vinyl Ester Resin Modified with a Vinyl Terminated Urethane Oligomer A portion (1001 grams) of the epoxy resin modified with a vinyl terminated urethane oligomer from A above was added to a reactor and heated to 90° C. When the 90° C. reaction temperature was achieved, an air sparge was started (0.5 liter per minute) then hydroquinone (290 ppm, 0.41 gram) and glacial methacrylic acid (4.685 mole, 403.3 grams) were sequentially added. After 5 minutes (300 s), 2,4,6-tris(N,N-dimethylaminomethyl)phenol (0.11 percent by weight, 1.5 grams) was added to the reactor then the reaction temperature was increased to 105° C. After 5 minutes (300 s) at the 105° C. reaction temperature, the temperature was increased to 117° C. After 420 minutes (25,200 s) of reaction at the 117° C. temperature, titration of a sample of the vinyl ester demonstrated the presence of 1.08 percent carboxylic acid and 0.97 percent epoxide. Oxalic acid (400 ppm, 0.56 gram), 4-chloro-2-nitrophenol (185 ppm, 0.26 gram) and styrene (379 grams) were added to the reactor. When the temperature reached 80° C., phenothiazine (270 ppm, 0.38 gram) and additional styrene (379 grams) were added to the reactor to provide a total of 35 weight percent styrene. The vinyl ester resin was recovered as a transparent, light yellow colored liquid.

COMPARATIVE EXPERIMENT C

Preparation of Vinyl Ester Resin

A portion (792 grams, 4.36 equiv.) of a diglycidyl ether of bisphenol A having an epoxide equivalent weight (EEW) of 181.5 was added to a reactor and heated with stirring to 90° C. When the 90° C. reaction temperature was achieved, an air sparge was started (0.5 liter per minute) then hydroquinone (210 ppm, 0.25 gram) and glacial methacrylic acid (4.36 mole, 375.3 gram) were sequentially added. After 5 minutes (300 s), 2,4,6-tris(N,N-dimethylaminomethyl)phenol (0.1 percent by weight, 1.19 grams) was added to the reactor then the reaction temperature was increased to 105° C. After 5 minutes (300 s) at the 105° C. reaction temperature, the temperature was increased to 117° C. After 480 minutes (28,800 s) of reaction at the 117° C. temperature, titration of a sample of the vinyl ester demonstrated the presence of 1.27 percent carboxylic acid and 0.8 percent epoxide. Oxalic acid (400 ppm, 0.47 gram) and styrene (315 grams) were added to the reactor. When the reaction temperature reached 80° C., phenothiazine (270 ppm, 0.32 gram) and additional styrene (315 grams) were added to the reactor to provide a total of 35 weight percent styrene. The vinyl ester resin was recovered as a transparent, light yellow colored liquid.

EXAMPLE 8

A. Preparation of an Advanced Diglycidyl Ether of Bisphenol A Modified with a Vinyl Terminated Urethane Oligomer A portion (750 grams) of a diglycidyl ether of bisphenol A having an epoxide equivalent (EEW) of 181.5, bisphenol A (177.4 grams) and tetrabutylphosphonium acetate.acetic acid complex (70% by weight in methanol) catalyst (0.64 gram) were added to a reactor and heated with stirring under a nitrogen atmosphere until a temperature of 150° C. was reached. Twenty minutes (1200 s) after the 150° C. reaction temperature was achieved, a maximum exotherm of 190° C. occurred after which time the reactor cooled over a twenty-two minute (1320 s) period to the 150° C. reaction temperature. After an additional 48 minutes (2880 s) of reaction at 150° C., the reactor was cooled to 115° C. Titration of a sample of the advanced epoxy resin revealed an EEW of 360. The nitrogen atmosphere was removed from the remaining 926.5 gram portion of the advanced epoxy resin, then a mixture of glacial methacrylic acid (0.0466 mole, 4.01 grams) and ethyltriphenylphosphonium acetate.acetic acid complex (70% by weight in methanol) catalyst (5 percent by weight of methacrylic acid used, 0.201 gram) was added to the reactor. The reaction was then allowed to progress for 45 minutes (2700 s) at the 115° C. reaction temperature. After completion of the reaction, the reactor was cooled to 110° C. over a four minute (240 s) period, a nitrogen atmosphere was established, and azobisisobutyronitrile catalyst (0.2 percent by weight of methacrylic acid and vinyl terminated urethane oligomer used, 0.17 gram) was added to the reactor. Two minutes (120 s) later, a portion (81.07 grams) of the vinyl terminated urethane oligomer from Example 1-A was added to the reactor. The reaction was continued at the 110° C. reaction temperature for an additional 60 minutes (3600 s) then the oligomer modified advanced epoxy resin was recovered as a light yellow colored opaque solid with an EEW of 406.

B. Preparation of Vinyl Ester Resin Modified with a Vinyl Terminated Urethane Oligomer A portion (802.8 grams) of the advanced epoxy resin modified with a vinyl terminated urethane oligomer from A above was added to a reactor and heated to 90° C. When the 90° C. reaction temperature was achieved, an air sparge was started (0.5 liter per minute) then hydroquinone (205 ppm, 0.2 gram) and glacial methacrylic acid (1.975 mole, 170 grams) were sequentially added. After 5 minutes (300 s), 2,4,6-tris(N,N-dimethylaminomethyl)phenol (0.12 percent by weight, 1.20 gram) was added to the reactor then the reaction temperature was increased to 110° C. After 5 minutes (300 s) at the 110° C. reaction temperature, the temperature was increased to 117° C. After 240 minutes (14,400 s) of reaction at the 117° C. reaction temperature, titration of a sample of the vinyl ester resin demonstrated the presence of 1.15 percent carboxylic acid and 1.1 percent epoxide. Oxalic acid (360 ppm, 0.35 gram) and styrene (397 grams) were added to the reactor. When the temperature reached 80° C., 4-chloro-2-nitrophenol (185 ppm, 0.18 gram), phenothiazine (270 ppm, 0.27 gram) and styrene (400 grams) were added to the reactor to provide a total of 45 weight percent styrene. The vinyl ester resin was recovered as a transparent, light colored liquid.

COMPARATIVE EXPERIMENT D

Preparation of Vinyl Ester Resin

The advancement reaction of Example 8-A was repeated. A portion (797.2 grams) of the advanced diglycidyl ether of bisphenol A having an epoxide equivalent weight (EEW) of 357 was added to a reactor and heated with stirring to 90° C. When the 90° C. reaction temperature was achieved, an air sparge was started (0.5 liter per minute) then hydroquinone (210 ppm, 0.21 gram) and glacial methacrylic acid (2.214 mole, 190.6 gram) were sequentially added. After 5 minutes (300 s), 2,4,6-tris(N,N-dimethylaminomethyl)phenol (0.1 percent by weight, 0.97 gram) was added to the reactor then the reaction temperature was increased to 110° C. After 5 minutes (300 s) at the 110° C. reaction temperature, the temperature was increased to 117° C. After 280 minutes (16,800 s) of reaction at the 117° C. temperature, titration of a sample of the vinyl ester demonstrated the presence of 1.08 percent carboxylic acid and 1.15 percent epoxide. Oxalic acid (360 ppm, 0.36 gram) and styrene (405 grams) were added to the reactor. When the temperature reached 80° C., 4-chloro-2-nitrophenol (185 ppm, 0.18 gram), phenothiazine (270 ppm, 0.27 gram) and styrene (405 grams) were added to the reactor to provide a total of 45 weight percent styrene. The vinyl ester resin was recovered as a transparent, light yellow colored liquid.

EXAMPLE 9

Portions of the vinyl ester resin of Example 1-C, Comparative Experiment A, Example 2-B, Example 3-B, Example 4-B, Example 5-C, Example 6-C, Comparative Experiment B, Example 7-B, Comparative Experiment C, Example 8-B and Comparative Experiment D were used for Kinematic viscosity (25° C.) and SPI gel test (84° C.) determinations. Clear, unfilled 1/8 inch (0.3175 cm) castings were prepared for heat distortion temperature (264 psi, 1820 kPa), tensile and flexural strength, flexural modulus, percent elongation and average Barcol hardness (934-1 scale) determinations. Additionally, portions of the following vinyl ester resins and styrene were mixed to provide resins with the indicated weight percent styrene: Example 1-C, 35 percent; Comparative Experiment A, 35 percent; Example 2-B, 35 percent; Example 3-B, 35 percent; Example 4-B, 35 percent; Example 5-C, 35 percent; Example 6-C, 35 percent; Comparative Experiment B, 35 percent; Example 7-B, 40 and 45 percent; and Comparative Experiment C, 40 and 45 percent. These resins were evaluated as previously described.

Each casting was cured at room temperature (25° C.) using a cure system of 1.22 percent by weight methyl ethyl ketone peroxide (50% active) and 0.3 percent by weight cobalt naphthenate (6 percent). Twenty-four hours (86,400 s) after the cure exotherm had subsided, post curing for 2 hours (7200 s) at 100° C. was completed. Mechanical properties of tensile (8) and flexural (6) test pieces were determined using an Instron machine with standard methods (ASTM D-638 and D-790). Heat distortion temperature of clear casting test pieces (2) was determined using an Aminco Plastic Deflection Tester (American Instrument Co.) with standard test methods (ASTM D-648 modified). The results are given in Table I.

TABLE I

| DESIGNATION (% STYRENE) | | | | | | | | |
|---|---|---|---|---|---|---|---|---|
| | Example 1-C | | Comp. Expt. A* | | Example 2-B | | Example 3-B | |
| | (30%) | (35%) | (30%) | (35%) | (30%) | (35%) | (30%) | (35%) |
| Viscosity (cs) | 1559 | 612 | 1529 | 534 | 1013 | 202 | 1615 | 608 |
| SPI Gel Test | | | | | | | | |
| gel time, min. | — | 6.6 | — | 6.4 | — | 8.4 | — | 8 |

TABLE I-continued

| DESIGNATION (% STYRENE) | | | | | | | | |
|---|---|---|---|---|---|---|---|---|
| , sec. | — | 396 | — | 384 | — | 504 | — | 480 |
| cure time, min. | — | 8.5 | — | 7.8 | — | 10.1 | — | 9.6 |
| , sec. | — | 510 | — | 468 | — | 606 | — | 576 |
| maximum exotherm, °F. | — | 425 | — | 371 | — | 388 | — | 418 |
| , °C. | — | 218 | — | 188 | — | 198 | — | 214 |
| Tensile Strength, psi | 9385 | 8723 | 7921 | 5609 | 11,415 | 11,100 | 10,592 | 10,712 |
| , kPa | 64,708 | 60,143 | 54,614 | 38,673 | 78,704 | 76,532 | 73,030 | 73,857 |
| Elongation (%) | 2.76 | 3.23 | 1.83 | 1.13 | 3.52 | 3.47 | 3.45 | 3.45 |
| Flexural Strength, psi | 15,178 | 17,697 | 12,089 | 14,569 | 18,425 | 21,110 | 18,272 | 18,936 |
| , kPa | 104,649 | 122,017 | 83,351 | 100,450 | 127,037 | 145,549 | 125,982 | 130,560 |
| Flexural Modulus, psi | 535,000 | 543,000 | 581,000 | 580,000 | 584,000 | 576,000 | 533,000 | 546,000 |
| , kPa | 3,688,718 | 3,743,876 | 4,005,879 | 3,998,984 | 4,026,563 | 3,971,405 | 3,674,928 | 3,764,561 |
| Heat Distortion Temperature, °F. | 276 | 288 | 285 | 290 | 205 | 238 | 230 | 234 |
| , °C. | 136 | 142 | 141 | 141 | 96 | 114 | 110 | 112 |

| | Example 4-B | | Example 5-C | | Example 6-C | | Comp. Expt. B* | |
|---|---|---|---|---|---|---|---|---|
| | (30%) | (35%) | (30%) | (35%) | (30%) | (35%) | (30%) | (35%) |
| Viscosity (cs) | 1998 | 846 | 850 | 375 | 1372 | 568 | 835 | 348 |
| SPI Gel Test | | | | | | | | |
| gel time, min. | — | 12.6 | — | 7.1 | 13.6 | 14 | — | 12.7 |
| , sec. | — | 756 | — | 426 | 816 | 840 | — | 762 |
| cure time, min. | — | 13.7 | — | 8.8 | 15 | 15.4 | — | 14.4 |
| , sec. | — | 822 | — | 528 | 900 | 924 | — | 864 |
| maximum exotherm, °F. | — | 310 | — | 380 | 388 | 397 | — | 405 |
| , °C. | — | 154 | — | 193 | 198 | 203 | — | 207 |
| Tensile Strength, psi | 10,572 | 10,483 | 8705 | 8308 | 10,286 | 9941 | 10,869 | 11,119 |
| , kPa | 72,892 | 72,278 | 60,019 | 57,282 | 70,920 | 68,541 | 74,940 | 76,663 |
| Elongation (%) | 3.78 | 3.68 | 4.71 | 4.8 | 2.83 | 2.72 | 2.67 | 3.02 |
| Flexural Strength, psi | 18,181 | 18,156 | 14,720 | 14,373 | 19,432 | 20,931 | 17,497 | 18,281 |
| , kPa | 125,354 | 125,182 | 101,492 | 99,099 | 133,980 | 144,315 | 120,638 | 126,044 |
| Flexural Modulus, psi | 533,000 | 548,000 | 429,000 | 428,000 | 610,000 | 601,000 | 611,000 | 616,000 |
| , kPa | 3,674,928 | 3,778,350 | 2,957,869 | 2,950,974 | 4,205,828 | 4,143,775 | 4,212,723 | 4,247,197 |
| Heat Distortion Temperature, °F. | 233 | 224 | 228 | 225 | 256 | 250 | 276 | 275 |
| , °C. | 112 | 107 | 109 | 107 | 124 | 121 | 136 | 135 |

| | Example 7-B | | | Comp. Expt. C | | | Example 8-B | Comp. Expt. D |
|---|---|---|---|---|---|---|---|---|
| | (30%) | (40%) | (45%) | (35%) | (40%) | (45%) | (45%) | (45%) |
| Viscosity (cs) | 143 | 75 | 43 | 91 | 30 | 18 | 153 | 141 |
| SPI Gel Test | | | | | | | | |
| gel time, min. | — | — | 10.9 | — | — | 10.1 | 14.8 | 15.8 |
| , sec. | — | — | 654 | — | — | 606 | 888 | 948 |
| cure time, min. | — | — | 15.5 | — | — | 13.1 | 22.4 | 21.7 |
| , sec. | — | — | 930 | — | — | 786 | 1344 | 1302 |
| maximum exotherm, °F. | — | — | 385 | — | — | 420 | 319 | 341 |
| , °C. | — | — | 196 | — | — | 216 | 159 | 172 |
| Tensile Strength, psi | 11,883 | 11,840 | 11,666 | 11,200 | 11,149 | 12,330 | 11,230 | 9,230 |
| , kPa | 81,931 | 81,634 | 80,435 | 77,222 | 76,870 | 85,013 | 77,429 | 63,639 |
| Elongation (%) | 4.91 | 5.87 | 4.56 | 3.02 | 3.23 | 4.48 | 5.70 | 2.26 |
| Flexural Strength, psi | 21,458 | 21,833 | 22,128 | 22,722 | 22,045 | 22,461 | 20,620 | 21,690 |
| , kPa | 147,949 | 150,534 | 152,568 | 156,664 | 151,996 | 154,864 | 142,171 | 149,548 |
| Flexural Modulus, psi | 574,000 | 561,000 | 560,000 | 589,000 | 579,000 | 574,000 | 522,000 | 548,000 |
| , kPa | 3,957,615 | 3,867,983 | 3,861,088 | 4,061,037 | 3,992,089 | 3,957,615 | 3,599,086 | 3,778,350 |
| Heat Distortion Temperature, °F. | 211 | 215 | 210 | 244 | 239 | 234 | 189 | 205 |
| , °C. | 99 | 102 | 99 | 118 | 115 | 112 | 87 | 96 |

*not an example of the invention

EXAMPLE 10

Portions of the vinyl ester resin of Example 2-B, Example 3-B, Example 4-B, Example 5-C and Comparative Experiment B and styrene were mixed to provide resins containing 35 percent by weight styrene. These solutions were used to prepare 0.0625 inch (1.5875 mm) clear, unfilled castings and cured using the method of Example 9. A pair of test pieces was prepared from each casting so as to have the following measurements: 6.5 inches length (165.1 mm), 0.625 inch (15.875 mm) width at tab ends, routed to a 0.4 inch (10.16 mm) width at center. Each test piece was used for plane strain compression testing with applied tension using the methods of P. B. Bowden and J. A. Jukes reported in the "Journal of Material Science", 3, 183 (1968) and 7, 52 (1972). The sample cross-sectional area was 0.025 square inch (0.16129 cm2) and tensile load was applied in 564 psi (3889 kPa) increments. The creep rate taken as yield was approximately 0.002 inch (3.048 mm/sec) per minute. Tension (psi) versus compression (psi) yield point values thus obtained were plotted. Tensile and compressive yield strength values were determined by extrapolation of the plotted biaxial yield line. Ductility was calculated as the ratio of compression at break to the compressive yield strength and that value was subtracted from one. The results as the average of each sample pair are reported in Table II.

TABLE II

|  | EXAMPLE 2-B | EXAMPLE 3-B | EXAMPLE 4-B | EXAMPLE 5-C | COMP. Expt. B* |
| --- | --- | --- | --- | --- | --- |
| Ductility | 0.686 | 0.607 | 0.698 | 0.786 | 0.342 |
| Tension at Break, psi | 9,778 | 7,966 | 9,466 | 8,538 | 5,784 |
| , kPa | 67,417 | 54,924 | 65,266 | 58,868 | 39,080 |
| Compression at Break, psi | 6,316 | 7,802 | 6,170 | 3,930 | 15,258 |
| , kPa | 43,548 | 53,793 | 42,541 | 27,097 | 105,201 |
| Tensile Yield Strength, psi | 14,250 | 13,050 | 13,700 | 10,725 | 17,250 |
| , kPa | 98,251 | 89,977 | 94,459 | 73,947 | 118,935 |
| Compressive Yield Strength, psi | 20,099 | 19,845 | 20,433 | 18,325 | 23,201 |
| , kPa | 138,579 | 136,827 | 140,881 | 126,347 | 159,966 |

*not an example of the invention

EXAMPLE 11

A. Preparation of a Diglycidyl Ether of Bisphenol A Modified with a Vinyl Terminated Urethane Oligomer A portion (400 grams) of a diglycidyl ether of bisphenol A having an epoxide equivalent weight (EEW) of 183 was added to a reactor and heated with stirring until a temperature of 115° C. was achieved. At this time, a mixture of glacial methacrylic acid (0.0172 mole, 1.48 grams) and ethyltriphenylphosphonium acetate.acetic acid complex (70% in methanol) catalyst (5 percent by weight of methacrylic acid used, 0.074 gram) was added to the reactor, then the reaction was allowed to progress for 45 minutes (2700 s) at the 115° C. reaction temperature. After completion of the reaction, the reactor was cooled to 110° C. over a 5 minute (300 s) period, a nitrogen atmosphere was established, and azobisisobutyronitrile catalyst (0.2 percent by weight of methacrylic acid and vinyl terminated urethane oligomer used, 0.063 gram) was added to the reactor. Two minutes (120 s) later, a portion (30 grams) of the vinyl terminated urethane oligomer from Example 1-A was added to the reactor. The reaction was continued at the 110° C. reaction temperature for an additional 60 minutes (3600 s) then the oligomer modified epoxy resin was recovered as a light yellow colored, transparent liquid with an EEW of 188.8.

B. Curing of a Diglycidyl Ether of Bisphenol A Modified with a Vinyl Terminated Urethane Oligomer A portion (219 grams) of the oligomer modified epoxy resin from A above was heated to 100° C. then combined thoroughly with 4,4'-diaminodiphenylmethane (57.43 grams) which was also heated to 100° C. The resulting mixture was used to prepare a clear, unfilled ⅛ inch (0.3175 cm) casting which was cured at 100° C. for 2 hours (7200 s) and then post cured at 125° C. for 2 hours (7200 s), 175° C. for 2 hours (7200 s) and 200° C. for 2 hours (7200 s). Mechanical properties of the opaque, white colored casting were determined using the method of Example 9. The results are given in Table III.

COMPARATIVE EXPERIMENT E

A portion (200 grams, 1.09 equiv.) of a diglycidyl ether of bisphenol A having an epoxide equivalent weight (EEW) of 183 was heated to 100° C. then combined thoroughly with 4,4'-diaminodiphenyl methane (54.1 grams) which was also heated to 100° C. The resulting mixture was used to prepare clear, unfilled ⅛ inch (3.175 mm) casting using the method of Example II-B. Mechanical properties were determined using the method of Example II-B. The results are given in Table III.

TABLE III

|  | Example II-B | Comparative Experiment E |
| --- | --- | --- |
| Tensile Strength, psi | 9912 | 10,645 |
| , kPa | 68,341 | 73,395 |
| Elongation (%) | 6.58 | 5.61 |
| Flexural Strength, psi | 18,665 | 19,778 |
| , kPa | 128,691 | 129,471 |
| Flexural Modulus, psi | 382,000 | 445,000 |
| , kPa | 2,633,813 | 3,068,186 |
| Heat Distortion Temperature (°F./°C.) | 316.8/158.3 | 329/165 |

EXAMPLE 12

A. Preparation of a Vinyl Terminated Urethane Oligomer from a Polypropylene Glycol, Toluene Diisocyanate, Tripropylene Glycol Monomethyl Ether and 2-Hydroxyethyl Acrylate Toluene diisocyanate (1.202 moles, 209.39 grams) and phenothiazine (210 ppm, 0.341 gram) were added to a reactor and maintained with stirring at 22° C. under a nitrogen atmosphere. Polypropylene glycol having an average molecular weight of 2000 (0.608 mole, 1216.55 grams) was mixed with stannous octoate catalyst (545 ppm, 0.885 gram) and a triethylenediamine catalyst (Dabco 33LV) (545 ppm, 0.885 gram) and this mixture was added to the reactor. The reaction was allowed to progress for 60 minutes (3600 s) at 65° C., after which time infrared spectrophotometric analysis of a film sample of the reaction product demonstrated essentially complete reaction (disappearance of hydroxyl group absorbance). At this time, 2-hydroxyethyl acrylate (0.609 mole, 70.69 grams) was added to the reactor and the reaction temperature was increased to 75° C. After 30 minutes (1800 s) at the 75° C. reaction temperature, infrared spectrophotometric analysis of a film sample of the reaction product demonstrated essentially complete reaction (disappearance of hydroxy group absorbance). At this time, tripropylene glycol monomethyl ether (0.605 mole, 124.73 grams) was added to the reactor and the reaction temperature was increased to 75° C. After 30 minutes (1800 s) at the 75° C. reaction temperature, infrared spectrophotometric analysis of a film sample of the reaction product demonstrated essentially complete reaction (disappearance of hydroxyl group absorbance, disappearance of isocyanate group absorbance). Hydroquinone (0.082 gram) was added as an inhibitor and the product was recovered as a transparent, viscous liquid of the following statistical structure:

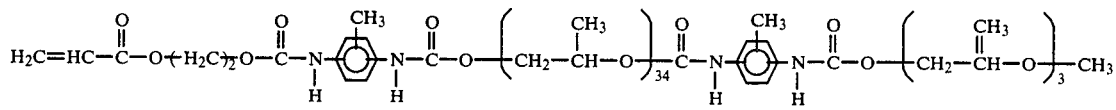

B. Preparation of a Diglycidyl Ether of Bisphenol A Modified with a Monovinyl Terminated Urethane Oligomer and Polystyrene A portion (600 grams, 3.3 equiv.) of a diglycidyl ether of bisphenol A having an epoxide equivalent weight (EEW) of 181.5 was added to a reactor and heated with stirring under a nitrogen atmosphere until a temperature of 150° C. was achieved. At this time, a mixture of glacial methacrylic acid (0.0661 mole, 5.69 grams), vinyl terminated urethane oligomer (100 grams) from A above, styrene (300 grams) and t-butylperoxybenzoate catalyst (3 percent by weight of styrene used, 9 grams) was added to the reactor over a 75 minute (4500 s) period, then the reaction was allowed to progress for an additional 60 minutes (3600 s) at the 150° C. reaction temperature. The oligomer and polystyrene modified epoxy resin was recovered as a transparent, light yellow colored liquid with an EEW of 305.6.

C. Preparation of Vinyl Ester Resin Modified with a Monovinyl Terminated Urethane Oligomer and Polystyrene A portion (964.2 grams) of the epoxy resin modified with a monovinyl terminated urethane oligomer and polystyrene from B above was added to a reactor and heated to 90° C. When the 90° C. reaction temperature was achieved, a nitrogen sparge was started (0.5 liter per minute) then ethyltriphenylphosphonium acetate.acetic acid complex (70% in methanol) catalyst (0.714 percent by weight of epoxy resin used, 0.680 gram). The reactor was heated to 120° C. and maintained for 60 minutes (3600 s), after which time the reactor was cooled to 110° C. and the nitrogen sparge replaced with an air sparge (0.5 liter per minute). At this time, hydroquinone (210 ppm based on epoxy resin used, 0.26 gram) and glacial methacrylic acid (3.151 moles, 271.3 grams) were sequentially added. After 5 minutes (300 s), 2,4,6-tris(N,N-dimethylaminomethyl)phenol (0.15 percent by weight of epoxy resin used, 1.45 grams) was added to the reactor then the reaction temperature was increased to 117° C. After 420 minutes (25,200 s) of reaction at the 117° C. temperature, titration of a sample of the vinyl ester demonstrated the presence of 1.08 percent carboxylic acid and 0.89 percent epoxide. Oxalic acid (364 ppm, 0.45 gram) and styrene (265.25 grams) were added to the reactor. When the temperature reached 90° C., 4-chloro-2-nitrophenol (182 ppm, 0.22 gram), phenothiazine (272 ppm, 0.34 gram) and styrene (265.25 grams) were added to the reactor to provide a total of 30 weight percent styrene. The vinyl ester resin was recovered as a transparent, light yellow colored liquid.

EXAMPLE 13

Portions of the vinyl ester resin of Example 12-C and styrene were mixed to provide resins with a 35, 40 and 45 percent by weight styrene and were used for physical and mechanical property evaluations using the method of Example 9. Barcol hardness was determined and is on the 934-1 scale. The results are given in Table IV.

TABLE IV

| | Example 12-C | | |
|---|---|---|---|
| | 35 percent styrene | 40 percent styrene | 45 percent styrene |
| Viscosity (cs) | 614 | 269 | 136 |
| SPI Gel Test | | | |
| gel time, min. | — | — | 11 |
| , sec. | — | — | 660 |
| cure time, min. | — | — | 14.2 |
| , sec. | — | — | 852 |
| maximum exotherm, °F. | — | — | 348 |
| , °C. | — | — | 175.6 |
| Tensile Strength, psi | 10,971 | 11,181 | 10,481 |
| , kPa | 75,643 | 77,091 | 72,264 |
| Elongation (%) | 5 | 4.04 | 4.69 |
| Flexural Strength, psi | 19,020 | 18,689 | 19,826 |
| , kPa | 131,139 | 128,857 | 136,696 |
| Flexural Modulus, psi | 503,000 | 572,000 | 542,000 |
| , kPa | 3,468,084 | 3,943,826 | 3,736,982 |
| Heat Distortion Temperature, °F. | 175 | 178 | 181 |
| Heat Distortion Temperature, °C. | 79 | 81 | 83 |
| Barcol Hardness | 41 | 41 | 40 |

We claim:

1. A polymer modified epoxy resin composition which comprises a copolymerization product of
   (A) from about one to about 99 percent by weight of an epoxy resin wherein from about 0.01 to about 10 mole percent of the epoxide groups have been reacted to provide groups containing polymerizable ethylenic unsaturation;
   (B) from about one to about 99 percent by weight of at least one vinyl terminated urethane oligomer; and
   (C) from about zero to about 75 percent by weight of one or more polymerizable ethylenically unsaturated compounds.

2. A composition of claim 1 wherein
   (i) component (A) is present in a quantity of from about 25 to about 95 percent by weight;
   (ii) component (B) is present in a quantity of from about 5 to about 75 percent by weight;
   (iii) component (C) is present in a quantity of from about zero to about 50 percent by weight; and
   (iv) from about 0.05 to about 6 mole percent of the epoxide group of component (A) have been reacted.

3. A composition of claim 1 wherein
   (i) component (A) is present in a quantity of from about 50 to about 90 percent by weight;
   (ii) component (B) is present in a quantity of from about 10 to about 50 percent by weight;
   (iii) component (C) is present in a quantity of from about zero to about 40 percent by weight; and
   (iv) from about 0.1 to about 3 mole percent of the epoxide groups of component (A) have been replaced.

4. A composition of claim 1 wherein
   (i) component (A) is the reaction product of (1) an epoxy resin or mixture of epoxy resins represented by the following formulas I, II, III or IV

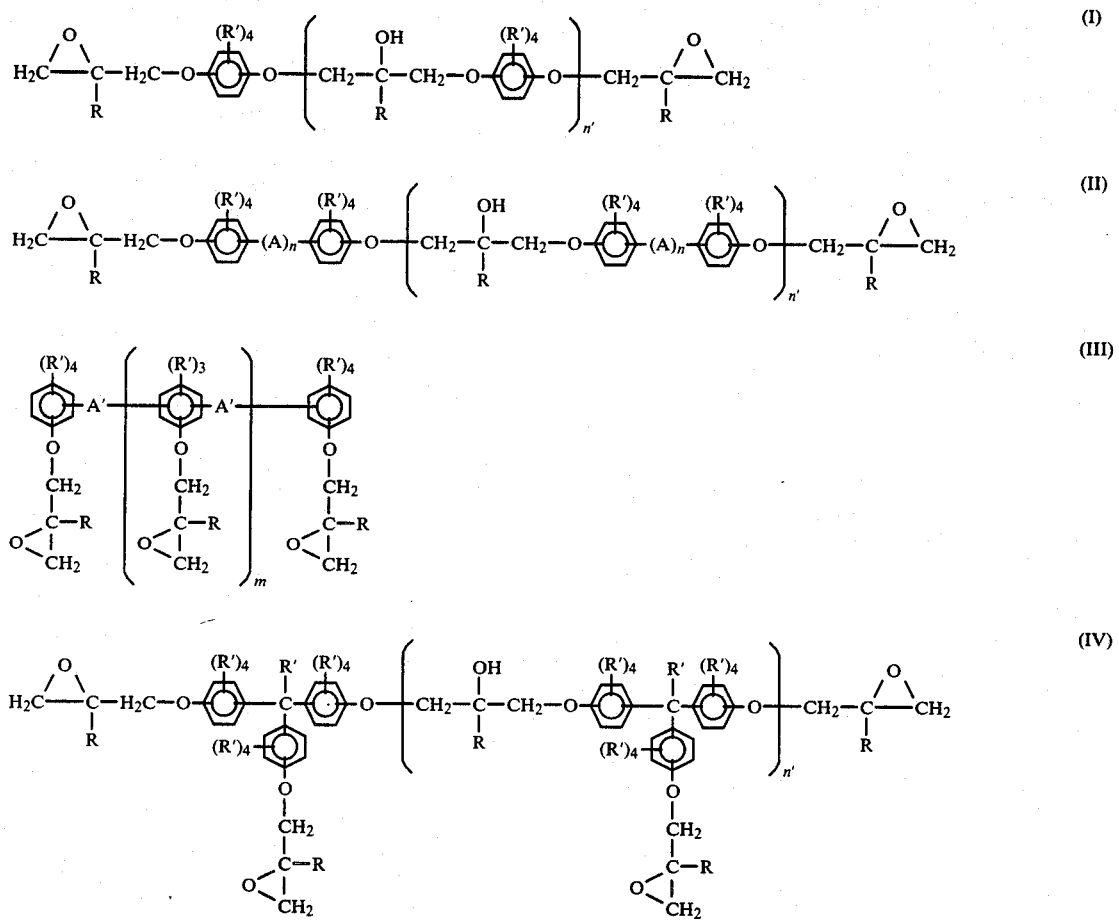

wherein A is a divalent hydrocarbon group having from 1 to about 12 carbon atoms,

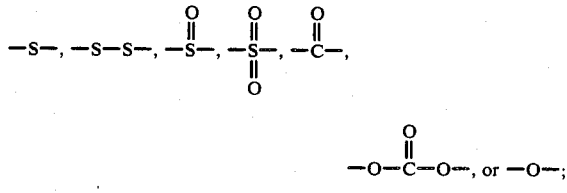

A' is a divalent hydrocarbon group having from 1 to about 3 carbon atoms or a

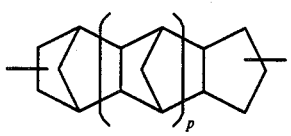

group; p has a value of from zero to aobut 10; each R' is independently hydrogen, a hydrocarbyl or hydrocarbyloxy group having from 1 to about 10 carbon atoms or a halogen, R is independently hydrogen or a hydrocarbyl group having from 1 to about 3 carbon atoms; n has a value of zero or 1; n' has a value of zero to about 40; and m has a value of from about 0.001 to about 6; with (2) one or more compounds possessing a group reactive with an epoxide group and a polymerizable ethylenically unsaturated group selected from the group consisting of alkenyl phenols, allyl alcohols, acrylic acids, hydroxyalkylacrylates, aminoalkylacrylates, monoesterified α,β-unsaturated dicarboxylic acids, alkenylphenyl glycidyl ethers, glycidyl acrylates and acrylamides; and (ii) component (B) is a vinyl terminated urethane oligomer possessing two vinyl groups per molecular proportion.

5. A composition of claim 2 wherein
(i) component (A) is the reaction product of (1) an epoxy resin or mixture of epoxy resins represented by the following formulas I, II, III or IV

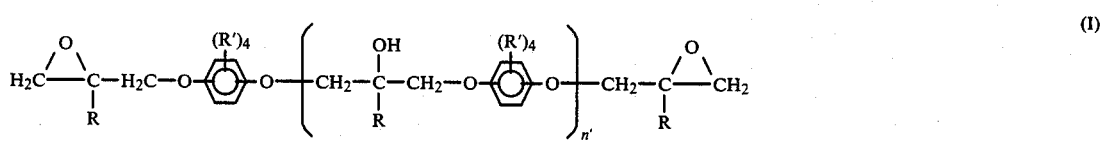

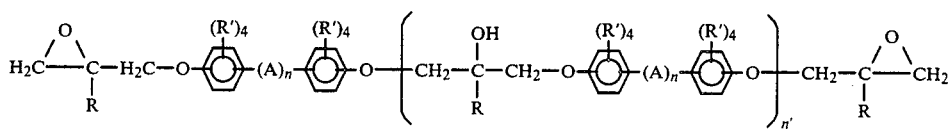 (II)

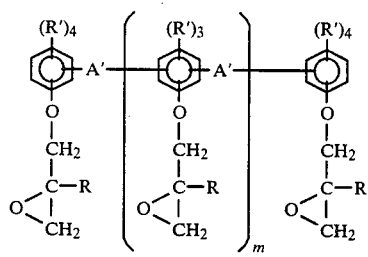 (III)

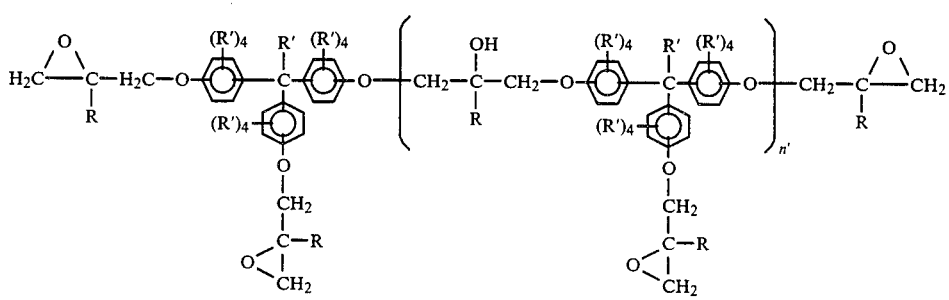 (IV)

wherein A is a divalent hydrocarbon group having from 1 to about 12 carbon atoms,

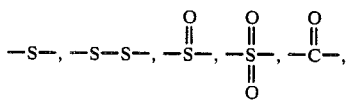

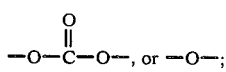

A' is a divalent hydrocarbon group having from 1 to about 3 carbon atoms or a

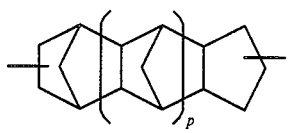

group; p has a value of from zero to about 10; each R' is independently hydrogen, a hydrocarbyl or hydrocarbyloxy group having from 1 to about 10 carbon atoms or a halogen, R is independently hydrogen or a hydrocarbyl group having from 1 to about 3 carbon atoms; n has a value of zero or 1; n' has a value of zero to about 40; and m has a value of from about 0.001 to about 6; with (2) one or more compounds possessing a group reactive with an epoxide group and a polymerizable ethylenically unsaturated group selected from the group consisting of alkenyl phenols, allyl alcohols, acrylic acids, hydroxyalkylacrylates, aminoalkylacrylates, monoesterified α,β-unsaturated dicarboxylic acids, alkenylphenyl glycidyl ethers, glycidyl acrylates and acrylamides; and (ii) component (B) is a vinyl terminated urethane oligomer possessing three vinyl groups per molecular proportion.

6. A composition of claim 3 wherein
(i) component (A) is the reaction product of (1) an epoxy resin or mixture of epoxy resins represented by the following formulas I, II, III or IV

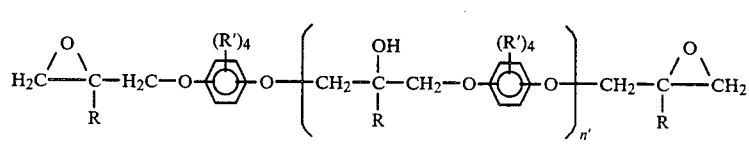 (I)

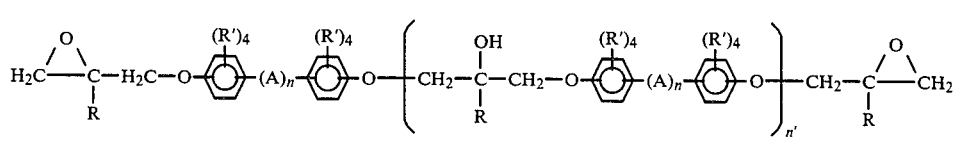 (II)

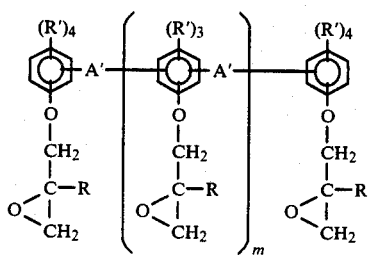
(III)

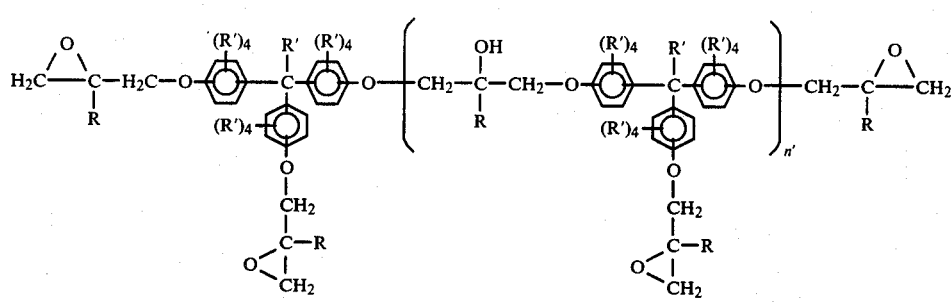
(IV)

wherein A is a divalent hydrocarbon group having from 1 to about 12 carbon atoms,

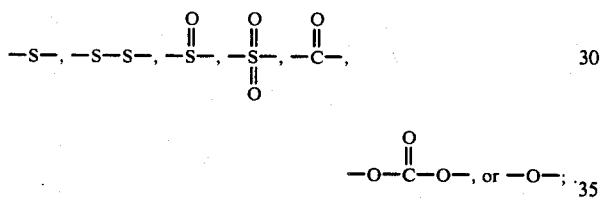

A' is a divalent hydrocarbon group having from 1 to about 3 carbon atoms or a

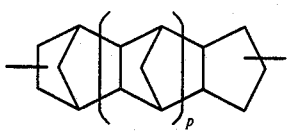

group; p has a value of from zero to about 10; each R' is independently hydrogen, a hydrocarbyl or hydrocarbloxy group having from 1 to about 10 carbon atoms or a halogen, R is independently hydrogen or a hydrocarbyl group having from 1 to about 3 carbon atoms; n has a vlue of zero or 1; n' has a vlue of zero to about 40; and m has a value of from about 0.001 to about 6; with (2) one or more compounds possessing a group reactive with an epoxide group and a polymerizable ethylenically unsaturated group selected from the group consisting of alkenyl phenols, allyl alcohols, acrylic acids, hydroxyalkylacrylates, aminoalkylacrylates, monoesterified α,β-unsaturated dicarboxylic acids, alkenylphenyl glycidyl ethers, glycidyl acrylates and acrylamides; and (ii) component (B) is a vinyl terminated urethane oligomer possessing one vinyl group per molecular proportion.

7. A composition of claim 4 wherein component (A-2) is acrylic acid, methacrylic acid or mixture thereof.

8. A composition of claim 5 wherein component (A-2) is acrylic acid, methacrylic acid or mixture thereof.

9. A composition of claim 6 wherein component A-2) is acrylic acid, methacrylic acid or mixture thereof.

10. A composition of claim 7 wherein component (C) is styrene.

11. A composition of claim 8 wherein component (C) is styrene.

12. A composition of claim 9 wherein component (C) is styrene.

13. A product resulting from curing a composition of claims 1, 2, 3, 4, 5, 6, 7, 8, 9, 10, 11 or 12 with a curing amount of a suitable curing agent therefor.

* * * * *